United States Patent [19]

Glaser

[11] 4,250,897
[45] Feb. 17, 1981

[54] AXIAL FLOW ROTARY COMBINE HARVESTER WITH PLENUM-LIKE SEPARATOR HOUSING

[75] Inventor: Fritz Glaser, Zweibrücken, Fed. Rep. of Germany

[73] Assignee: Deere & Company, Moline, Ill.

[21] Appl. No.: 77,252

[22] Filed: Sep. 19, 1979

[30] Foreign Application Priority Data

Sep. 30, 1978 [DE] Fed. Rep. of Germany ....... 2842702

[51] Int. Cl.³ ............................................. A01F 12/18
[52] U.S. Cl. .................................. 130/27 T; 56/14.6; 130/27 Z
[58] Field of Search .............................. 56/14.6, 16.5; 130/27 T, 27 Z, 27 R

[56] References Cited

U.S. PATENT DOCUMENTS

| | | | |
|---|---|---|---|
| 3,645,270 | 2/1972 | Rowland-Hill | 130/27 T |
| 3,827,443 | 8/1974 | Drayer | 130/27 T |
| 3,847,160 | 11/1974 | De Coene | 130/27 T |
| 3,857,400 | 12/1974 | De Coene | 130/27 T |

*Primary Examiner*—Jay N. Eskovitz

[57] ABSTRACT

The threshing, separating, and cleaning elements of the harvester are contained in a housing which has openings only in its front and rear walls. A threshing and separating rotor surrounded by a generally cylindrical, partially foraminous casing, extends fore-and-aft through an upper portion of the separator housing and penetrates the forward wall of the housing to permit feeding of crop material to the rotor. During separation straw is carried in a generally spiral path, rearwardly in the annular space between rotor and casing and fed into a transverse rotary straw discharge beater, which finally discharges straw through a rearward opening in the separator housing. An arcuate floor under the discharge beater is connected to the rearward end of the separator casing so that a continuous channel or conduit for the passage of straw extends through the separator housing. Beneath the straw discharge beater floor, an opening in the rear wall of the separator housing, serves as a second outlet from the housing. A blower connected to an inlet in a forward wall of the housing provides air flow to assist in the separation process. The blower and the second outlet are sized so that the second outlet effectively restricts or throttles the flow of air from the separator housing, so that a significant increase in pressure develops, the housing thus becoming a plenum in which the rotor and casing are contained. The resulting tendency for air to seek to pass radially inward through the openings in the separator casing and hence out through the first outlet of the separator housing with the straw, inhibits the passage of chaff radially outwards from the separator casing and out into the plenum and hence reduces the chaff load on the cleaning shoe situated below the separator casing. A single blower may provide the air for both the conventional cleaning shoe air function and the plenum pressurizing function or, alternatively, separate blowers may be provided for each of these needs.

9 Claims, 3 Drawing Figures

U.S. Patent Feb. 17, 1981 Sheet 1 of 2 4,250,897

AXIAL FLOW ROTARY COMBINE HARVESTER WITH PLENUM-LIKE SEPARATOR HOUSING

BACKGROUND OF THE INVENTION

This invention relates to axial flow rotary combine harvesters and more particularly to the use of air to assist in the cleaning of threshed and separated grain.

The general arrangement of axial flow rotary combine harvesters in which, in an upper part of a separator housing, one or more fore-and-aft extending rotors are surrounded by an at least partially foraminous casing to provide the threshing and separating functions of the combine in their forward and rearward portions respectively is well known. Combine harvesters of this general type are disclosed in U.S. Pat. Nos. 3,827,443 Drayer and 3,645,270 Rowland-Hill. Typically, a cleaning shoe including reciprocating generally horizontal sieve elements is enclosed in a lower part of the separator housing and a grain pan and/or conveyor arrangement is provided to conduct separated grain, usually mixed with considerable chaff and other material other then grain (MOG), from the grates or concaves of the casing to the cleaning shoe. A blower provides air to assist in separating the chaff from the grain and act as a medium for carrying the separated chaff rearwardly from the cleaning shoe to be discharged through an opening in a rear wall of the separator housing.

It is characteristic of axial flow rotary threshing and separating devices to generate and deliver to the cleaning shoe, a greater proportion of chaff than is typical of the more conventional threshing and separating apparatus consisting of a transverse threshing cylinder and concave and reciprocating straw walkers. In addition, axial flow rotary threshing and separating devices have an inherently greater specific capacity than conventional machines so that if the capacity of te cleaning shoe is to match that of the separator and chaff overloading is to be avoided, it must be disproportionately large. U.S. Pat. No. 3,645,270 referred to above and U.S. Pat. Nos. 3,847,160 De Coene et al and 3,857,400 De Coene all disclose means intended to modify air flow in a separator housing, external to the separator or casing or concave, so as to improve cleaner efficiency but do not suggest means for reducing the amount of chaff entering the cleaning zone.

SUMMARY OF THE INVENTION

Accordingly, an object of the present in ention is to reduce proportionately the amount of c ..ff which reaches the cleaning shoe.

According to the present invention, there is provided, an axial flow rotary combine harvester having a separator housing including a longitudinally extending, rotatable, threshing and separating rotor within a partially foraminous cylindrical casing through which the rotor propels crop material in a helical path, threshed and separated material passing through the foramina and dropping to a cleaning apparatus disposed below the casing and arranged to remove chaff from the material. A blower is arranged to deliver air into the front of the separator housing, and a restricted air outlet at the rear of the separator housing causes an increase of air pressure in the plenum-like housing, tending to prevent chaff passing radially outwards through the rotor casing. The blower produces a dynamic pressure externally of the rotor casing, which contributes to less chaff being discharged from the casing and being passed to the cleaning shoe. The dynamic pressure makes it difficult for even the heavy particles of the chaff to pass through the openings in the casing, such particles being retained in the casing to be discharged to the exterior along with the straw by way of an outlet opening at the end of the separator housing.

The blower (axial or centrifugal) may direct air into the space between the casing and the cleaning apparatus. Alternatively, the blower may deliver air to the separator housing so that it flows up through the cleaning apparatus. The air flow then also assists the cleaning action within the cleaning apparatus. Alternatively, a plurality of separate, spaced air nozzles may be provided below the cleaning apparatus. The nozzles may be interconnected by way of air conduits and jointly supplied with air by way of a second blower. Those nozzles preferably blow upwardly and rearwardly.

The cross-sectional area of the separator housing outlet opening can be controlled in part by a bottom portion or floor of a straw discharge conveyor which is provided at the rearward end of the separator casing. A baffle may be provided to effect further reduction and/or adjustment in opening size.

The cleaning apparatus preferably covers more than half the overall length of the separator casing and may cover approximately the whole overall length of the threshing and separating portions. Therefore, all the crop material which is separated out from the threshing portion can be received by the cleaning apparatus so that in this way the overall structural length of the cleaning apparatus and the threshing and separating drum can be kept small.

It is also advantageous for the separator housing to be in the form of a closed housing with an air inlet opening and an outlet opening whose total cross-sectional area is less than the total cross-sectional area of the inlet opening.

In order further to increase the degree of efficiency of the cleaning apparatus, it is advantageous for a screen conveyor belt which permits additional cleaning of the crop material to be provided between the separator casing and the cleaning apparatus.

DESCRIPTION OF THE PREFERRED EMBODIMENT

Figure 1:
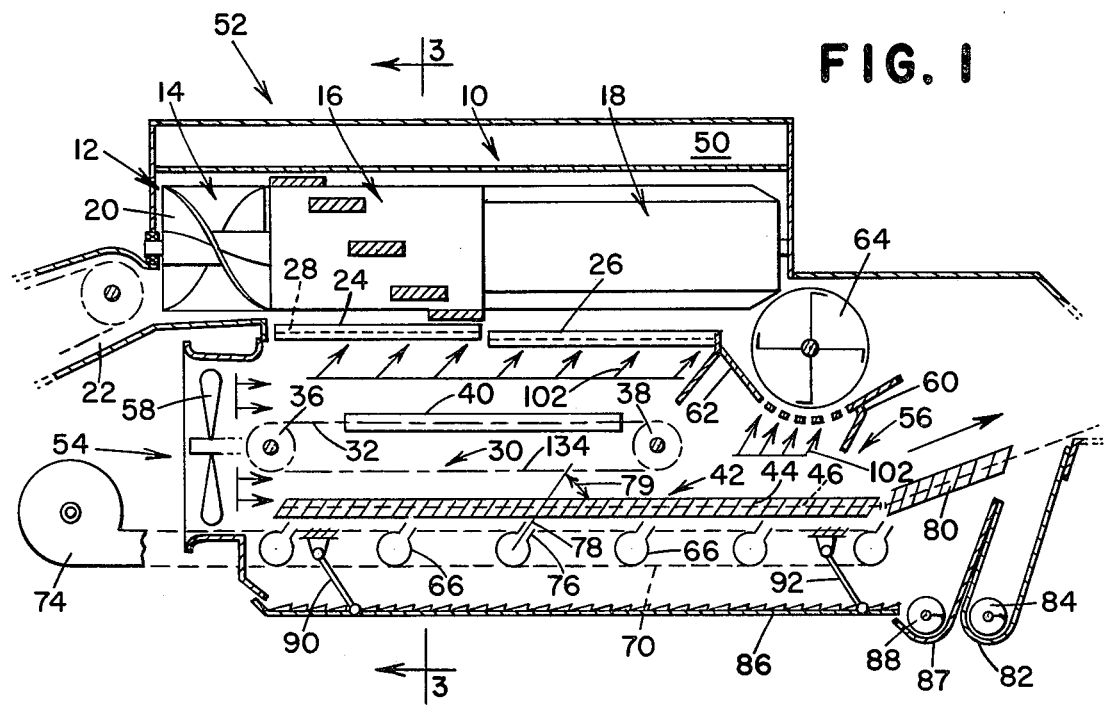
FIG. 1 is a diagrammatic cross-sectional view approximately on a central longitudinal vertical plane of the body of an axial flow combine embodying the invention.

Referring to FIG. 1, a separator casing 10 for a combine harvester which operates on the axial flow rotary principle houses a threshing and separating rotor 12. The rotor 12 comprises a receiving portion 14, a threshing portion 16 and a separating portion 18. The receiving portion 14 includes a conveyor screw 20 which is fixed to the rotor 12 and which receives the crop material from an inclined conveyor 22 and passes it to the threshing portion 16. The casing 10 is provided with a threshing concave 24 and a separating grate 26, both of which have numerous openings 28. The openings 28 may be provided, as shown, only in the lower part of the casing 10 as in threshing concave 24 and the separating grate 26, or may extend around the full periphery of the casing.

The threshed crop material passes through the openings 28 and falls onto a screen belt 30 which is disposed below the rotor 12 and includes an upper arm 32 and a lower run 34. The screen belt 30 passes over conveyor rollers 36 and 38 and is driven by conventional drive means (not shown). At its sides, the upper run 32 may be received in two oppositely positioned guide rails 40 (best seen in FIG. 3) which can be driven with an oscillating movement having a vertical direction component by way of a conventional support and drive means (not shown), whereby the upper run 32 can be moved with an oscillating motion so that the degree of cleaning efficiency is further increased. Disposed below the screen belt 30 is a plate-type screen or sieve 42 which receives crop material from the screen belt 30 and separates out the remaining chaff components. For this purpose, the screen 42 has numerous openings 46 which are formed by adjustable plates 44 and through which primarily the cleaned crop material and a small part of the chaff pass. As is conventional, the screen 42 may be mounted for oscillating motion by way of rocking arms in the region of its front and rear ends and may be driven by way of conventional drive means (not shown).

The screen belt 30 and the sieve 42 are between the opposite walls 50 of the separator housing 52 which is closed on all sides and which has only an inlet opening 54 and an outlet opening 56. Disposed in the inlet opening 54 is an axial blower 58 which passes cleaning air through the cleaning housing 52 and blows air over the screen belt 32 and the sieve 42. Since a throttle, i.e. a reduction in cross-section, is provided in the region of the outlet opening 56, an increased pressure occurs within the separator housing 52. In the embodiment shown in FIG. 1, the throttling is effected by an inclined deflector member 60 which is arranged below the bottom portion 62 of a transverse straw discharge beater 64. The upper and lower limits of the outlet opening 56 are defined by the lower edge of the deflector member 60 and the surface of the screen 42. The effective size of the outlet opening 56 at the rear is such that the opening acts as a restriction and the separator housing 52 becomes a plenum, pressurized to a level greater than that within the separator casing so that air seeks to flow radially inwards through the openings 28 of the concave and grate 24 and 26 respectively thus impeding the movement radially outwards of chaff through the openings 28. On the contrary, the cleaning air tends to cause the chaff to remain in the casing 10 and to be conveyed with the straw spirally downstream by the rotor 12 to be discharged to the exterior by way of the discharge beater 64. This arrangement prevents a large proportion of the chaff from reaching the screen belt 30 and thus overloading the cleaning system and reducing the degree of cleaning efficiency.

Figure 3:
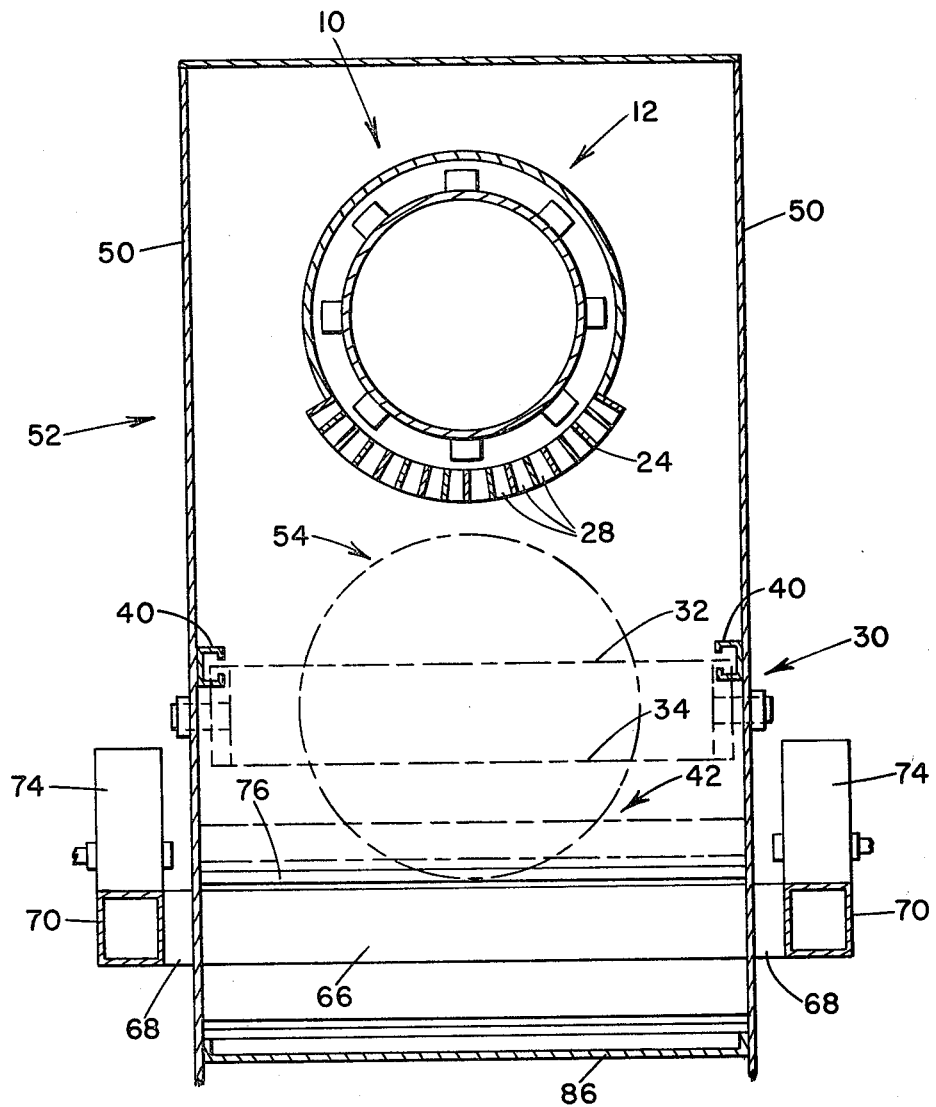
FIG. 3 is an enlarged diagrammatic cross-sectional view of the combine body approximately on line 3—3 of FIG. 2.

Disposed below the sieve 42 are numerous spaced air nozzles 66 which, as indicated in FIG. 3, may span the entire width of the sieve 42 and which have at their ends inlet openings to which short lateral air conduits 68 are connected. The air conduits 68 are connected by way of two opposite longitudinal air conduits 70 to a pair of opposite blowers 74. In this way, all the air nozzles 66 may be uniformly supplied with cleaning air. Each air nozzle 66 has an outlet 76 which is directed upwardly and rearwardly towards the sieve 42. A nozzle longitudinal axis 78 extends through the nozzle outlet 76 and forms an acute angle 79, to the surface of the sieve 42. This assists the chaff to be passed rearwardly by means of the cleaning air, over a further sieve or screen 80 which adjoins the sieve 42 and which is in communication with a tailings passage 82 which has a tailings auger 84. The crop material which is discharged over the rear of the sieve 80 includes that which has not been completely threshed (tailings) and it is returned to the rotor 12 by way of the auger 84, and other conventional conveying means (not shown) and passed through the threshing and separating process again.

Disposed below the air nozzles 66 is a return bottom member or grain pan 86 which is oscillatingly mounted on rocking arms 90 and 92 and which passes the cleaned crop material to a clean grain conveyor 88 which is provided in a trough-like depression 87 and which passes the cleaned grain to the grain tank (not shown) of the combine harvester. As can be seen in particular from FIG. 1, the entire length of the sieve 42 almost completely covers or underlies the threshing and separating portion. This is because not all chaff components issue from the separator casing 10 and pass on to the sieve 42. By virtue of this arrangement, therefore, it is possible for the overall structural length of the combine harvester to be kept smaller than hitherto.

Figure 2:
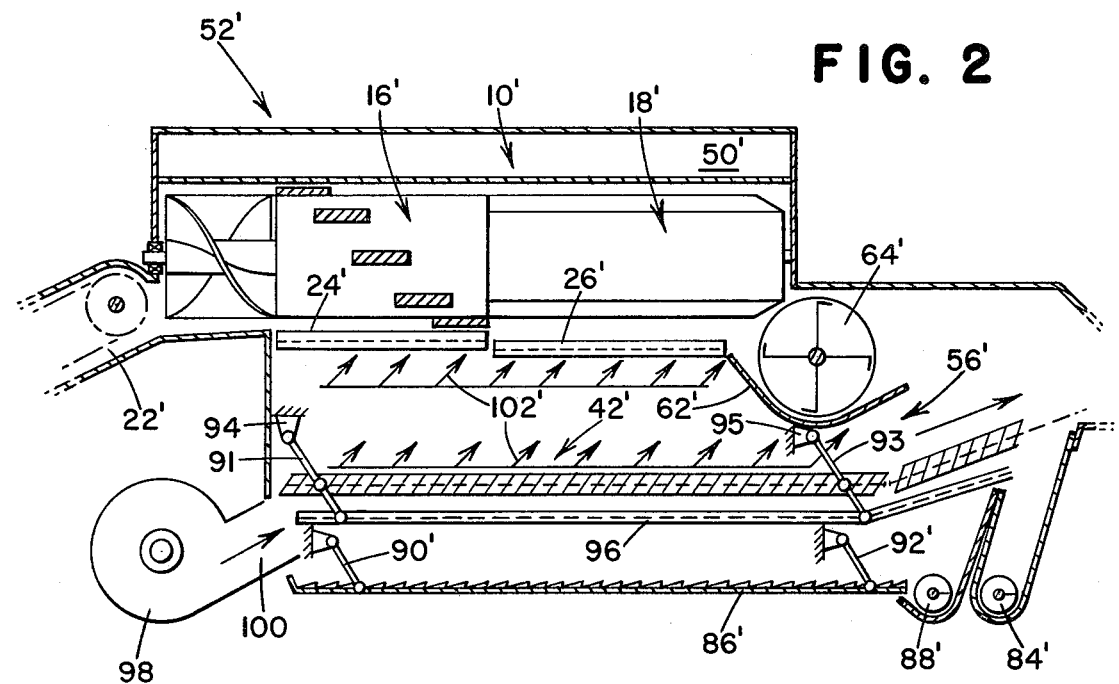
FIG. 2 is a similar view of a second embodiment.

In the modified embodiment of FIG. 2, there is no screen belt between the separator casing 10' and the sieve 42' so that the threshold crop material passes directly onto the sieve 42' which also covers the entire length of the threshing and separating portions 16' and 18'. In this embodiment, the screen 42' is mounted oscillatingly on rocking arms 91 and 93 which are connected to the combine harvester frame by way of mountings 94 and 95. Disposed below the sieve 42' is a further sieve 96. Tailings pass to the tailings conveyor 84' by way of the lower sieve 96. The clean grain which passes through the sieve 96 is received by the return bottom member or grain pan 86' which conveys it to the clean grain conveyor 88'. The sieve 42' and the threshing concave 24' and separating grate 26' are both subjected to a flow of air by way of a centrifugal blower 98 whose blower passage 100 extends at an inclined angle rearwardly with reference to the horizontally extending surface of the sieve 42'. The cross-section of the blower passage 100 is greater than the cross-sectional area of the outlet opening 56'. The outlet opening 56' is defined by the bottom portion 62' of the discharge conveyor 64', by the surface of the sieve 42' and by the opposite separator body sides 50'. Instead of the deflector member 60', it is possible to provide other resistance means in the outlet region of the outlet opening 56', such resistance means contributing to throttling the discharge flow of cleaning air and thus producing an increase in pressure in the separator housing 52'. The direction of portions of the air flow is illustrated in the drawings by the individual arrows 102 and 102'.

As can be seen in particular from FIG. 2, the lower sieve 96 may also be connected to the rocking arms 91 and 93 of the sieve 42' and be displaced in an oscillating motion jointly with the sieve 42'.

I claim:

1. An axial flow rotary combine comprising:
    an elongated mobile body having a longitudinal axis and including a wall having opposite side, top and bottom and upstream and downstream end portions together defining a plenum-like enclosure;

an axial flow rotary separator including a generally cylindrical at least partially foraminous casing having upstream and downstream ends in crop material conducting communication with a crop material inlet and a straw outlet in the upstream and downstream wall portions respectively of the housing, and a rotor supported for rotation generally concentrically within the casing so as to define an annular space between the rotor and casing, the rotor and casing surfaces having juxtaposed material control elements;

a cleaning shoe including a generally horizontal sieve disposed below and at least partially underlying the separator casing;

a cleaning air outlet in the wall downstream end portion and being of a first cross-sectional area;

a cleaning air inlet spaced upstream from the cleaning air outlet and being of a second cross-sectional area;

a blower connected to and operable to deliver cleaning air through the cleaning air inlet; and gathering and conveying means carried by the body and operable to remove crop material from a field and deliver it through crop material inlet for engagement by the rotor, rotor and casing cooperating as the rotor rotates to propel crop material downstream in a generally spiral path and process the material, a portion of the material including straw being retained within the casing for discharge at the straw discharge outlet and another portion of the material including grain and chaff tending to pass radially outwards through the foramina of the casing and pass downwards within the housing to be received by the sieve of the cleaning shoe, the cleaning air outlet being relatively smaller than the cleaning air inlet resulting in a plenum-like increase of air pressure in the enclosure and a pressure gradient through the foramina of the casing, inhibiting the movement of chaff through the foramina so that at least some of the chaff is retained within the casing and discharged through the straw discharge outlet.

2. The invention defined in claim 1 wherein the cleaning air inlet is disposed so as to deliver air into the space between the casing and the sieve of the cleaning shoe.

3. The invention defined in claim 2 and further including a second cleaning air blower carried by the body and a second cleaning air inlet in the housing wall the blower being operable to deliver air through the second cleaning air inlet and blower and inlet being disposed so that said air is directed in a downstream and upward direction towards the cleaning shoe sieve.

4. The invention defined in claim 3 wherein the second cleaing air inlet is included in the upstream wall portion of the housing and the air from said blower is directed to an upstream portion of the sieve.

5. The invention defined in any one of claims 1–4 and further including a straw discharge conveyor carried by the body and disposed adjacent the straw discharge outlet of the casing and in a crop material receiving relationship with said casing, the discharge conveyor including a conveying element and a conveyor floor beneath the element, said conveyor floor at least partially defining an upper portion of the cleaning air outlet and extending somewhat below the casing and contributing to restriction of air flow from the housing.

6. The invention defined in claim 1 and further including an adjustable baffle spanning a portion of the cleaning air outlet and adjustable so as to vary the effective size of the outlet.

7. The invention defined in any one of claims 1–4 wherein the housing wall defines an enclosure substantially closed to the atmosphere except for the direct communication of the cooling air inlets and outlet and the indirect communication of the crop material inlet and straw discharge outlet by way of the foramina in the separator casing.

8. The invention defined in claim 1 wherein the sieve of the cleaning shoe underlies the separator casing to an extent equal to at least half the overall length of the casing.

9. The invention defined in claim 1 wherein the cleaning air inlet is disposed so as to deliver air into the enclosure in the space below the sieve of the cleaning shoe.

* * * * *